(12) United States Patent
Jean-Francois

(10) Patent No.: US 11,890,930 B1
(45) Date of Patent: Feb. 6, 2024

(54) SYSTEMS FOR ELECTRIC POWERTRAIN DIFFERENTIAL

(71) Applicant: Dana Automotive Systems Group, LLC, Maumee, OH (US)

(72) Inventor: Al Jean-Francois, Detroit, MI (US)

(73) Assignee: DANA AUTOMOTIVE SYSTEMS GROUP, LLC, Maumee, OH (US)

( * ) Notice: Subject to any disclaimer, the term of this patent is extended or adjusted under 35 U.S.C. 154(b) by 0 days.

(21) Appl. No.: 17/930,327

(22) Filed: Sep. 7, 2022

(51) Int. Cl.
| | |
|---|---|
| *B60K 17/344* | (2006.01) |
| *B60K 6/445* | (2007.10) |
| *F16H 37/08* | (2006.01) |
| *B60K 17/04* | (2006.01) |
| *B60K 17/16* | (2006.01) |
| *F16H 48/05* | (2012.01) |
| *B60K 25/00* | (2006.01) |
| *F16H 48/10* | (2012.01) |
| *B62D 5/04* | (2006.01) |
| *B60K 23/04* | (2006.01) |

(52) U.S. Cl.
CPC ......... *B60K 25/00* (2013.01); *F16H 37/0813* (2013.01); *F16H 48/10* (2013.01); *B60K 6/445* (2013.01); *B60K 17/043* (2013.01); *B60K 17/16* (2013.01); *B60K 17/344* (2013.01); *B60K 23/04* (2013.01); *B62D 5/0403* (2013.01); *F16H 48/05* (2013.01)

(58) Field of Classification Search
CPC ...... B60K 25/00; B60K 17/344; B60K 17/16; B60K 23/04; F16H 48/10; F16H 37/0813
See application file for complete search history.

(56) References Cited

U.S. PATENT DOCUMENTS

| | | | | |
|---|---|---|---|---|
| 4,055,091 | A * | 10/1977 | Kerr | F16H 35/02 475/904 |
| 6,105,704 | A * | 8/2000 | Hamada | B60K 6/00 903/910 |
| 6,125,953 | A * | 10/2000 | Arai | B60K 6/52 180/243 |
| 6,401,850 | B1 | 6/2002 | Bowen | |
| 8,403,088 | B2 | 3/2013 | Knoblauch et al. | |
| 8,777,796 | B2 | 7/2014 | Petersen et al. | |
| 9,096,126 | B2 * | 8/2015 | Knoblauch | B60K 1/02 |
| 9,102,233 | B2 * | 8/2015 | Knoblauch | B60K 17/12 |
| 9,140,335 | B2 * | 9/2015 | Knoblauch | B60K 17/046 |
| 9,527,382 | B2 | 12/2016 | Smetana | |
| 9,625,021 | B2 | 4/2017 | Knoblauch et al. | |
| 9,783,035 | B1 | 10/2017 | Huang et al. | |
| 10,518,627 | B2 | 12/2019 | Nagpal et al. | |

(Continued)

FOREIGN PATENT DOCUMENTS

| | | | |
|---|---|---|---|
| DE | 102016106544 | A1 * | 10/2017 |
| KR | 20170143301 | A * | 12/2017 |
| WO | WO-2020120723 | A1 * | 6/2020 |

OTHER PUBLICATIONS

"Portal axle," The Reader View of Wikipedia Website, Available Online at https://thereaderwiki.com/en/Portal_axle, Retrieved on Sep. 7, 2022, 6 pages.

*Primary Examiner* — Tinh Dang
(74) *Attorney, Agent, or Firm* — McCoy Russell LLP

(57) ABSTRACT

Systems are provided for a differential of an electric powertrain. In one example, a system includes a portal axle coupled to only one side of a differential, the portal axle comprising a first axle and a second axle coaxial with one another.

16 Claims, 3 Drawing Sheets

(56) References Cited

U.S. PATENT DOCUMENTS

| | | | |
|---|---|---|---|
| 10,525,810 B2 | 1/2020 | Jegebris et al. | |
| 10,797,562 B2 | 10/2020 | Dlala et al. | |
| 2004/0220011 A1* | 11/2004 | Gumpoltsberger | F16H 48/36 |
| | | | 475/205 |
| 2018/0112755 A1* | 4/2018 | Littlefield | B60K 17/046 |
| 2018/0339695 A1* | 11/2018 | Kawahara | H02K 7/116 |

* cited by examiner

SYSTEMS FOR ELECTRIC POWERTRAIN DIFFERENTIAL

TECHNICAL FIELD

The present description relates generally to a differential of an electric powertrain.

BACKGROUND AND SUMMARY

Powertrain packaging space continues to decrease. The needs of beam axle designs may force gear and bearing positions into undesired positions. These positions may increase manufacturing difficulty or difficulty in providing maintenance to the gears and bearings.

Thus, a demand for a powertrain that reduces the complexities with regard to packaging the gears and bearings may be desired. In one example, the issues described above may be addressed by a system with a portal axle coupled to only one side of a differential, the portal axle comprising a first axle and a second axle coaxial with one another.

The first axle and the second axle may be coupled to different side gears of the differential while extending through the same side of the differential. In one example, the first axle and the second axle are concentric about a central axis of the differential. The differential may be coupled to an output of an electric motor or other propulsion device. A jumper shaft may include separate portions with corresponding gears coupled to separate output axles. The output axles may be coupled to and configured to drive separate devices It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

The above, as well as other advantages of the present disclosure, will become readily apparent to those skilled in the art from the following detailed description when considered in light of the accompanying drawings in which.

DETAILED DESCRIPTION

Figure 1:
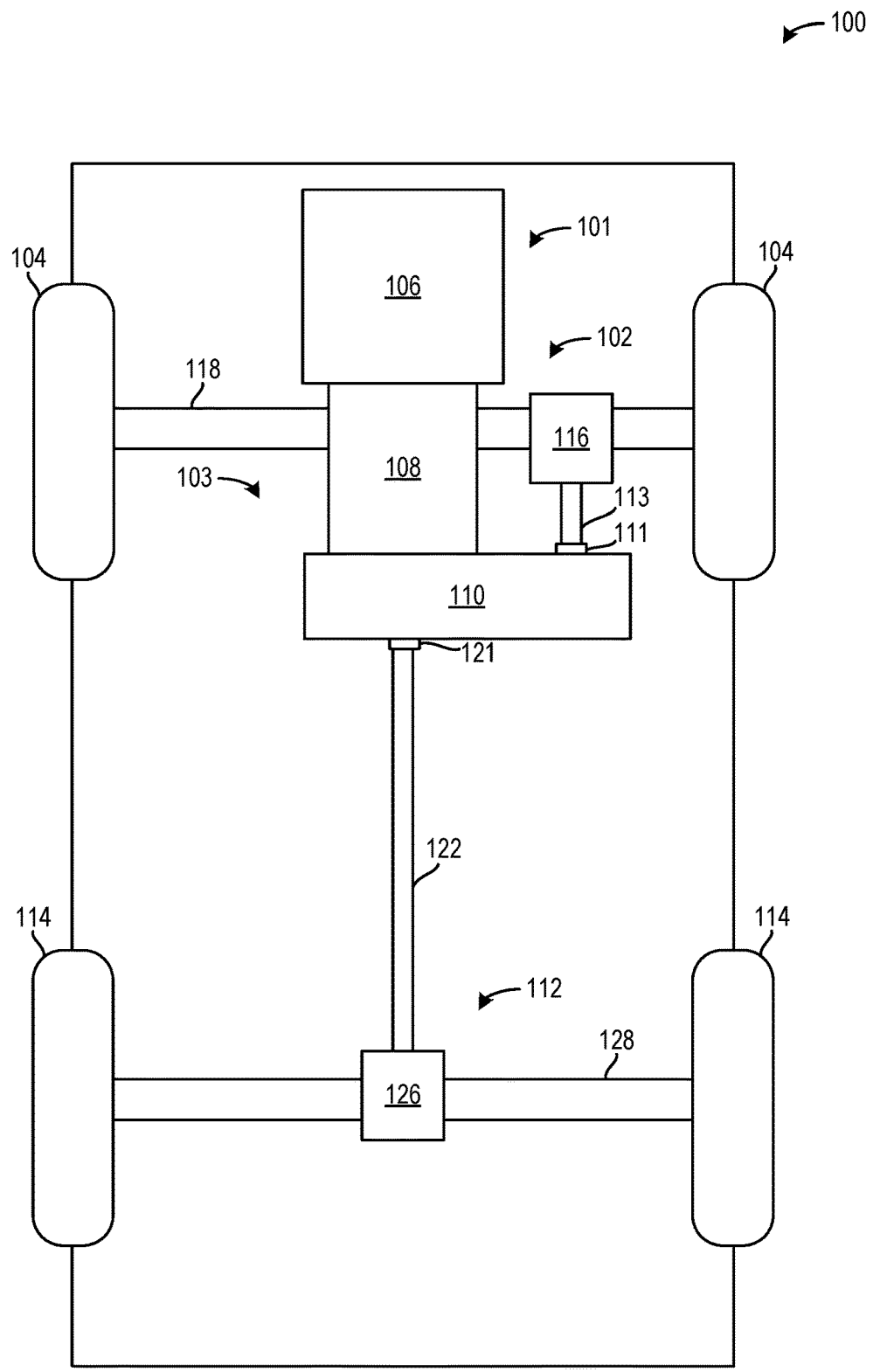
FIG. 1 is a schematic depiction of an example vehicle powertrain.
Figure 2:
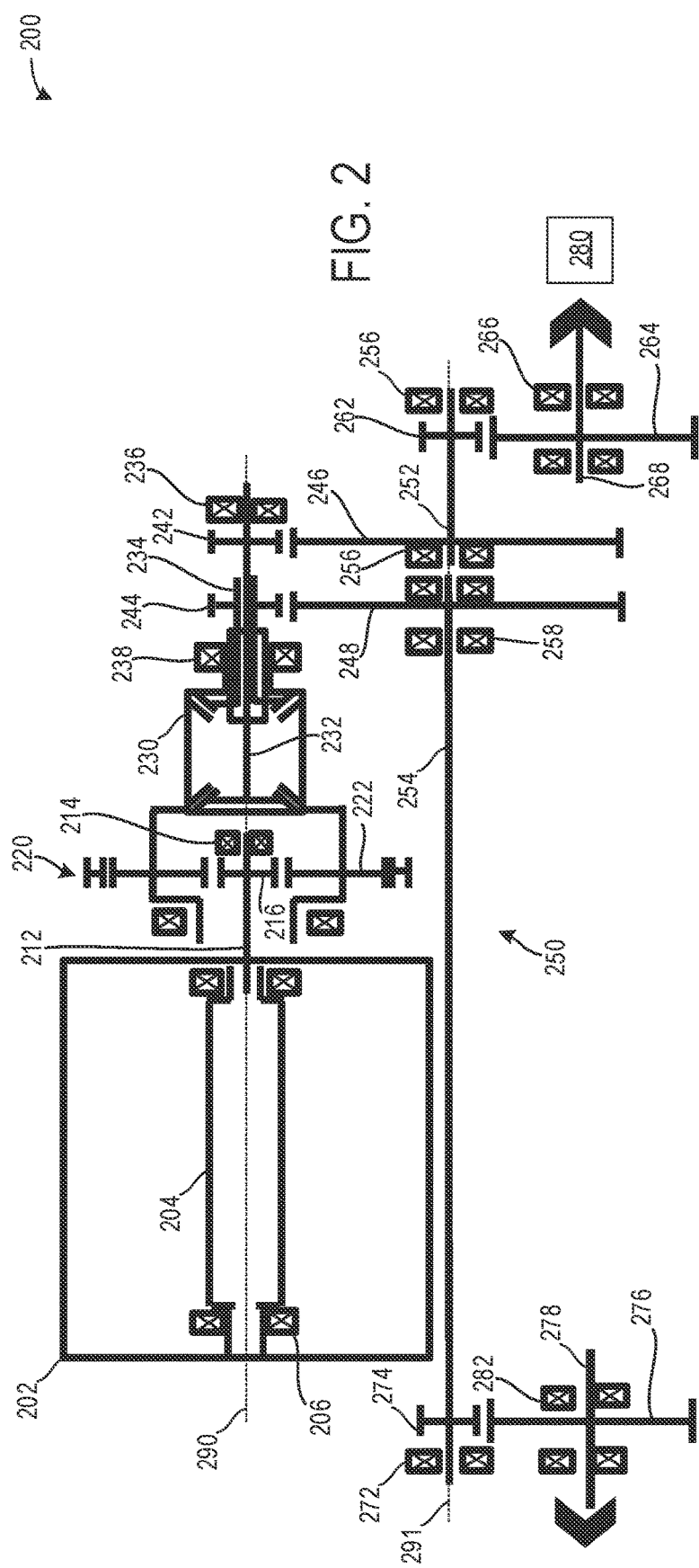
FIG. 2 is a first embodiment of an electric transmission comprising a differential.
Figure 3:
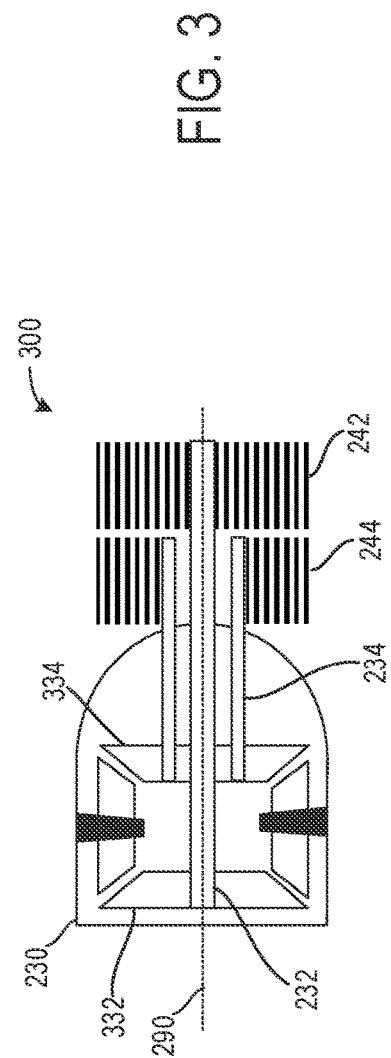
FIG. 3 is a schematic view of the differential.
Figure 4:
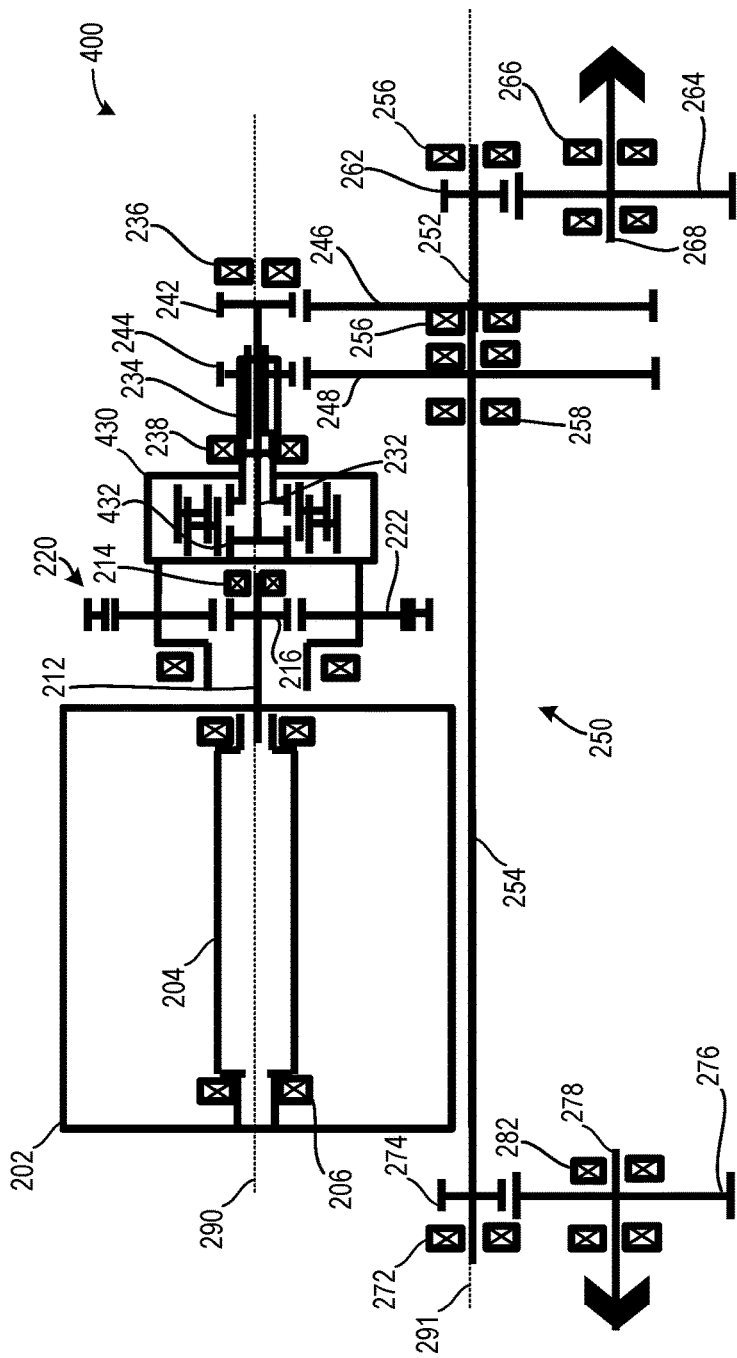
FIG. 4 is a second embodiment of an electric transmission comprising a differential.
Figure 5:
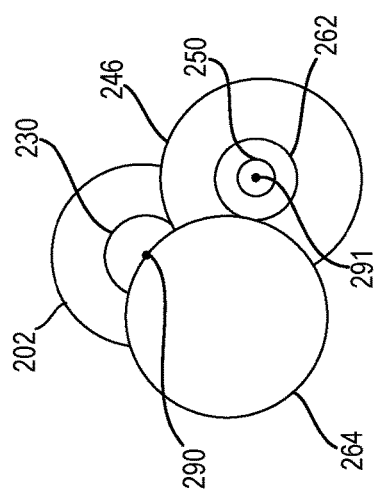
FIG. 5 is an end view of an arrangement of the gears of the electric transmission.

The following description relates to a system for an axle assembly in a vehicle. For example, the vehicle may be propelled by a powertrain, such as illustrated in FIG. 1. FIG. 2 is a first embodiment of an electric transmission comprising a differential. FIG. 3 is a schematic view of the differential. FIG. 4 is a second embodiment of an electric transmission comprising a differential. FIG. 5 is an end view of an arrangement of the gears of the electric transmission.

FIGS. 1-5 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

Turning now to FIG. 1, a vehicle 100 is shown comprising a powertrain 101 and a drivetrain 103. The powertrain comprises a prime mover 106 and a transmission 108. The prime mover 106 may be an internal combustion engine or an electric motor, for example, and is operated to provide rotary power to the transmission 108. The transmission 108 may be any type of transmission, such as a manual transmission, an automatic transmission, or a continuously variable transmission. The transmission 108 receives the rotary power produced by the prime mover 106 as an input and outputs rotary power to the drivetrain 103 in accordance with a selected gear or setting.

The vehicle 100 may be a commercial vehicle, light, medium, or heavy duty vehicle, a passenger vehicle, an off-highway vehicle, and sport utility vehicle. Additionally or alternatively, the vehicle 100 and/or one or more of its components may be in industrial, locomotive, military, agricultural, and aerospace applications.

In some examples, such as shown in FIG. 1, the drivetrain 103 includes a first axle assembly 102 and a second axle assembly 112. The first axle assembly 102 may be configured to drive a first set of wheels 104, and the second axle assembly 112 may be configured to drive a second set of wheels 114. In one example, the first axle assembly 102 is arranged near a front of the vehicle 100 and thereby comprises a front axle, and the second axle assembly 112 is arranged near a rear of the vehicle 100 and thereby comprises a rear axle. The drivetrain 103 is shown in a four-wheel drive configuration, although other configurations are possible. For example, the drivetrain 103 may include a front-wheel drive, a rear-wheel drive, or an all-wheel drive configuration. Further, the drivetrain 103 may include one or more tandem axle assemblies. As such, the drivetrain 103 may have other configurations without departing from the scope of this disclosure, and the configuration shown in FIG. 1 is provided for illustration, not limitation. Further, the vehicle 100 may include additional wheels that are not coupled to the drivetrain 103.

In some four-wheel drive configurations, such as shown in FIG. 1, the drivetrain 103 includes a transfer case 110 configured to receive rotary power output by the transmission 108. A first driveshaft 113 is drivingly coupled to a first output 111 of the transfer case 110, while a second driveshaft 122 is drivingly coupled to a second output 121 of the transfer case 110. The first driveshaft 113 (e.g., a front driveshaft) transmits rotary power from the transfer case 110 to a first differential 116 of the first axle assembly 102 to drive the first set of wheels 104, while the second driveshaft 122 (e.g., a rear driveshaft) transmits the rotary power from the transfer case 110 to a second differential 126 of the second axle assembly 112 to drive the second set of wheels 114. For example, the first differential 116 is drivingly coupled to a first set of axle shafts 118 coupled to the first set of wheels 104, and the second differential 126 is drivingly coupled to a second set of axle shafts 128 coupled to the second set of wheels 114. It may be appreciated that each of the first set of axle shafts 118 and the second set of axle shafts 128 may be positioned in a housing.

In some examples, additionally or alternatively, the vehicle 100 may be a hybrid vehicle including both an engine an electric machine each configured to supply power to one or more of the first axle assembly 102 and the second axle assembly 112. For example, one or both of the first axle assembly 102 and the second axle assembly 112 may be driven via power originating from the engine in a first operating mode where the electric machine is not operated to provide power (e.g., an engine-only mode), via power originating from the electric machine in a second operating mode where the engine is not operated to provide power (e.g., an electric-only mode), and via power originating from both the engine and the electric machine in a third operating mode (e.g., an electric assist mode). As another example, one or both of the first axle assembly 102 and the second axle assembly 112 may be an electric axle assembly configured to be driven by an integrated electric machine.

Turning now to FIG. 2, it shows an electric transmission assembly 200. The electric transmission assembly 200 may be included in vehicle 100. Thus, the electric transmission assembly 200 may be similar to the transmission 108 of FIG. 1. In one example, the electric transmission assembly 200 is a multi-speed transmission.

The electric transmission assembly 200 may include a first electric motor generator 202. An electric motor output shaft 212 may be operably coupled to an electric motor shaft 204 for rotation. The first electric motor generator 202, and additional electric motor generators, may provide power, which can drive a jumper shaft 250 coupled to a first output axle 268 and a second output axle 278. The first output axle 268 and the second output axle 278 may be coupled to a first device and a second device, respectively. The first device and the second device may be accessory devices, steering devices, or the like.

The electric motor shaft 204 may be supported for rotation via a plurality of bearings 206. The electric motor output shaft 212 may be coupled to the electric motor shaft 204 and supported for rotation via first shaft bearings 214. The electric motor shaft 204 and the electric motor output shaft 212 may rotate along a common axis 290.

The electric motor output shaft 212 may output to a first gear assembly 220 via an inner gear 216. The first gear assembly 220 may further include an outer gear 222 coupled to the inner gear 216. The first gear assembly 220 may output power provided thereto to a differential 230 via a shaft extending from the outer gear 222 to gears (e.g., differential pinions) of the differential 230.

In one example, the differential 230 may be an input differential 230. That is to say, the differential 230 may be configured to receive an output from the electric motor 202 and provide inputs to one or more planetary gear sets to control the first and second devices. In this way, the differential 230 may not directly power the first and second devices via shafts coupled thereto.

The differential 230 may include a divided output comprising a portal axle. More specifically, the differential 230 may include a first output shaft 232 and a second output shaft 234. The second output 234 may be coaxial to and concentric with the first output shaft 232 along the common axis 290 along which the electric motor shaft 204 and the electric motor output shaft 212 rotate. In one example, the differential 230 is located on the common axis 290, which may be interchangeably referred to herein as an input axis 290.

The first output shaft 232 may be supported for rotation via bearings 236 and coupled to a first differential output gear 242. The second output shaft 234 may be supported for rotation via bearings 238 and coupled to a second differential output gear 244. Each of the first output shaft 232 and the second output shaft 234 may be coupled to separate side gears of the differential 230 at ends opposite the differential output gears. In the example of FIG. 2, the first differential output gear 242 may be further from the differential 230 than the second differential output gear 244. Both the first and second differential output gears 242, 244 are configured to rotate about the input axis 290.

Turning to FIG. 3, it shows a detailed view 300 of the differential 230. The first output shaft 232 and the second output shaft 234 extend through a same side of the differential 230. In one example, all outputs of the differential 230 extend through only one side of the differential 230. By doing this, layout or arrangement of the electric powertrain including outputs thereof may be more flexible compared to differentials with output shafts extending from more than one side. Advantages of the differential 230 are described in greater detail below.

The second output shaft 234 may be a single piece shaft with a hollow center configured to allow the first output shaft 232, which may also be a single piece, solid shaft, to extend therethrough. The input axis 290 may extend through geometric centers of the first output shaft 232 and the second output shaft 234. The first output shaft 232 and the second output shaft 234 may be coupled to different gears of the differential 230 such that the first output shaft 232 and the second output shaft 234. In one example, the first output shaft 232 is coupled to a first differential side gear 332 and the second output shaft 234 is coupled to a second differential side gear 334. The second differential side gear 334 may be closed to the side of the differential 230 through which the first and second output shafts extend compared to the first differential side gear 332. In this way, the first output shaft 232 and the second output shaft 234 may be controlled independently relative to one another and provide different power outputs to remaining components of the electric powertrain.

Returning to FIG. 2, the first differential output gear 242 may be coupled to a first jumper shaft input gear 246. The first jumper shaft input gear 246 may be arranged on a first portion 252 of the jumper shaft 250. In one example, the jumper shaft 250 is arranged below an oil pan or other device. The first portion 252 may be configured to rotate about an output axis 291. The output axis 291 may be misaligned with and parallel to the input axis 290. In one example, the output axis 291 may be positioned independently of the input axis 290. That is to say, a flexibility in the configuration of the powertrain including a positioning of the output axis 291 relative to the input axis 290 may be increased relative to powertrain systems with outputs extending from multiple sides of a differential.

The first portion 252 may be supported for rotation via bearings 256. A first jumper shaft output gear 262 is arranged on the first portion 252 and coupled to a first output axle gear 264. The first output axle gear 264 may be positioned on a first output axle 268. The first output axle 268 may be configured to rotate about an axis parallel to the output axis 291 and the input axis 290 via bearings 266. The first output axle 268 may provide power to a first device 280, which may be an accessory device or a steering device. The accessory device may include a climate control device, a vehicle off-roading device, such as a winch or other towing device, lights, or other similar device.

The second differential output gear 244 may be coupled to a second jumper shaft input gear 248. The second jumper shaft input gear 248 may be arranged on a second portion 254 of the jumper shaft 250. The second portion 254 may be configured to rotate about the output axis 291 via support from bearings 272. A second jumper shaft output gear 274 may be coupled to a second output axle gear 276 positioned on a second output axle 278. The second output axle 278 may be configured to rotate about an axis parallel to the output axis 291 and input axis 290 via bearings 282. The second output axle 278 may provide power to a second device, different than the first device. In one example, the axis about which the second output axle 278 rotates may be misaligned with and not coaxial to the axis about which the first output axle 268 rotates. By doing this, a location of the output gear set may comprise a smaller size relative to previous examples. This may be achieved via power being divided to the first output axle 268 and the second output axle 278 rather than sending all power to a single output axle. Furthermore, a centerline of the output gear set may be located in dependently of the input axis 290 (e.g., a differential axis).

In this way, the differential 230 may control power transfer to the first wheel and the second wheel via the first output 232 and the second output 234. One or more of the outputs may be disengaged so that power is not transferred to a corresponding wheel. Additionally or alternatively, rotational speeds of the first output 232 and the second output 234 may be equal or different, resulting in the same or different amounts of power being transferred to the first and second devices.

By arranging the output shafts to extend through a same side of the differential, a location of an output gearset may be smaller. Power distribution to the output axles may be divided resulting in an overall reduction in packaging size of the outputs compared to an output axle with a single output and higher loading. The jumper shaft may be configured to accommodate various vehicle powertrain packaging requirements. Arranging the differential on the input side of the powertrain may allow the other components to be sized smaller relative to previous examples with the differential on the output side of the powertrain. Additionally, the single sided differential may provide myriad arrangement layouts for a plurality of powertrain packaging requirements.

Turning now to FIG. 4, it shows a second embodiment 400 of an electric powertrain similar to the first embodiment of the electric powertrain assembly 200 of FIG. 2 except for some differences between a differential 430 of the second embodiment 400 compared to the differential 230 of the first embodiment. In one example, the differential 430 is a single sided spur differential. The differential 430 may include larger side gears 432 relative to the side gears of the differential 230 illustrated in FIGS. 2 and 3. The larger side gears 432 may increase support provided for one or more of the first output 232 and the second output 234. Additionally or alternatively, a range of sizes of the first output 232 and the second output 234 may be increased via the oversized gears 432, allowing the differential 430 to fit a plurality of vehicle configurations without further modifications.

Turning now to FIG. 5, it shows an end view 500 viewing the system of FIG. 2 parallel to the input axis 290 and the output axis 291. A side profile of the first output axle gear 264 overlaps each of the electric motor 202, the differential 230, and the first jumper shaft input gear 246. The side profile of the first output axle gear 264 may be spaced away from the jumper shaft 250 and engaged with the first jumper shaft output gear 262.

The electric powertrain described above may reduce a powertrain packaging size while allowing the powertrain to fit a variety of vehicle packaging layouts. The single-sided, input differential may provide enhance flexibility with respect to a packaging size and position of an output shaft and its corresponding gears.

The disclosure provides support for a system including a portal axle coupled to only one side of a differential, the portal axle comprising a first axle and a second axle coaxial with one another. A first example of the system further includes where a central axis of the differential passes through geometric centers of the first axle and the second axle. A second example of the system, optionally including a first example, further includes where a central axis of the differential is misaligned with geometric centers of the first axle and the second axle. A third example of the system, optionally including one or more of the previous examples, further includes where the first axle comprises a first axle output gear coupled to a first jumper shaft gear, and the second axle comprises a second axle output gear coupled to a second jumper shaft gear. A fourth example of the system, optionally including one or more of the previous examples, further includes where the first jumper shaft gear is arranged on a first portion of a jumper shaft, the second jumper shaft gear is arranged on a second portion of the jumper shaft. A fifth example of the system, optionally including one or more of the previous examples, further includes where the jumper shaft outputs to an offset gear train coupled to accessory devices. A sixth example of the system, optionally including one or more of the previous examples, further includes where output shafts of the offset gear train are misaligned.

The disclosure provides additional support for an assembly for an electric powertrain, including an input differential coupled to a first shaft and a second shaft concentric about an input axis extending through geometric centers of the input differential, the first shaft, and the second shaft. A first example of the assembly further includes where the first shaft and the second shaft are coupled to a same side of the input differential. A second example of the assembly, optionally including the first example, further includes where the first shaft and the second shaft comprise corresponding gears coupled to gears of a jumper shaft. A third example of the assembly, optionally including one or more of the previous examples, further includes where gears of the jumper shaft are arranged on separate portions of the jumper shaft. A fourth example of the assembly, optionally including one or more of the previous examples, further includes where gears of the jumper shaft are coupled to output gears arranged on separate output shafts, wherein the separate output shafts are not coaxial. A fifth example of the assembly, optionally including one or more of the previous examples, further includes where the separate output shafts are coupled to a same accessory or different accessories. A sixth example of the assembly, optionally including one or more of the previous examples, further includes where the input differential comprises a planetary input differential. A seventh example of the assembly, optionally including one or more of the previous examples, further includes where the input differential is an input spur differential.

The disclosure provides further support for an electric powertrain system including a differential coupled an output of an electric motor, a first shaft extending through a side of the differential, and a second shaft extending through the side of the differential and coaxial with the first shaft, wherein the first shaft and the second shaft are concentric about a central axis of the differential. A first example of the electric powertrain system further includes a jumper shaft coupled to output shafts via gears, wherein the outputs shafts are misaligned. A second example of the electric powertrain system, optionally including the first example, further includes the output shafts comprise a first shaft coupled to a first device and a second device coupled to a second device. A third example of the electric powertrain system, optionally including one or more of the previous examples, further includes where the jumper shaft comprises a first portion with a first jumper shaft gear and a second portion with a second jumper shaft gear. A fourth example of the electric powertrain system, optionally including one or more of the previous examples, further includes where the differential is a spur differential.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system, comprising:
   a portal axle coupled to only one side of a differential, the portal axle comprising a first axle and a second axle coaxial with one another;
   the first axle comprising a first axle output gear coupled to a first jumper shaft gear, and the second axle comprising a second axle output gear coupled to a second jumper shaft gear; and
   an offset gear train coupled to accessory devices, the jumper shaft outputting to the offset gear train.

2. The system of claim 1, wherein a central axis of the differential passes through geometric centers of the first axle and the second axle.

3. The system of claim 1, wherein a central axis of the differential is misaligned with geometric centers of the first axle and the second axle.

4. The system of claim 1, wherein the first jumper shaft gear is arranged on a first portion of a jumper shaft, and the second jumper shaft gear is arranged on a second portion of the jumper shaft.

5. The system of claim 1, wherein central axes of the output shafts of the offset gear train are misaligned.

6. An assembly for an electric powertrain, comprising:
   an input differential coupled to a first shaft and a second shaft concentric about an input axis extending through geometric centers of the input differential, the first shaft, and the second shaft;
   a jumper shaft comprising gears coupled to gears of the first shaft and the second shaft, and gears coupled to output gears arranged on separate output shafts; and
   one or more accessories coupled to the separate output shafts.

7. The assembly of claim 6, wherein the first shaft and the second shaft are coupled to a same side of the input differential.

8. The assembly of claim 6, wherein gears of the jumper shaft are arranged on separate portions of the jumper shaft.

9. The assembly of claim 6, wherein the separate output shafts are not coaxial.

10. The assembly of claim 6, wherein the input differential comprises a planetary input differential.

11. The assembly of claim 6, wherein the input differential is an input spur differential.

12. An electric powertrain system, comprising:
    a differential coupled an output of an electric motor;
    a first shaft extending through a side of the differential;
    a second shaft extending through the side of the differential and coaxial with the first shaft, wherein the first shaft and the second shaft are concentric about a central axis of the differential; and
    a jumper shaft coupled to output shafts via a first jumper shaft gear and a second jumper shaft gear.

13. The electric powertrain system of claim 12, wherein central axes of the outputs shafts are misaligned.

14. The electric powertrain system of claim 13, wherein the output shafts comprise a first shaft coupled to a first device and a second shaft coupled to a second device.

15. The electric powertrain system of claim 13, wherein the jumper shaft comprises a first portion with the first jumper shaft gear and a second portion with the second jumper shaft gear.

16. The electric powertrain system of claim 12, wherein the differential is a spur differential.

\* \* \* \* \*